(12) United States Patent
Solihin (10) Patent No.: US 8,868,800 B2
(45) Date of Patent: Oct. 21, 2014

(54) ACCELERATOR BUFFER ACCESS

(71) Applicant: Empire Technology Development, LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/978,655

(22) PCT Filed: Mar. 12, 2013

(86) PCT No.: PCT/US2013/030520
§ 371 (c)(1),
(2), (4) Date: Jul. 8, 2013

(65) Prior Publication Data
US 2014/0281058 A1     Sep. 18, 2014

(51) Int. Cl.
*G06F 13/38* (2006.01)
*G06F 5/12* (2006.01)
*G06F 3/00* (2006.01)

(52) U.S. Cl.
CPC .................... *G06F 5/12* (2013.01)
USPC ............ 710/52; 710/2; 710/5; 710/8; 710/11; 710/15

(58) Field of Classification Search
None
See application file for complete search history.

(56) References Cited

U.S. PATENT DOCUMENTS

| | | |
|---|---|---|
| 6,560,688 B1 | 5/2003 | Strongin et al. |
| 2011/0145541 A1 | 6/2011 | Ito et al. |
| 2011/0161619 A1 | 6/2011 | Kaminski et al. |
| 2013/0249925 A1* | 9/2013 | Ginzburg ................ 345/564 |

OTHER PUBLICATIONS

Hou, Rui et al., "Efficient Data Streaming with On-chip Accelerators: Opportunities and Challenges",Proc. of the International Symposium on High-Performance Computer Architecture, Feb. 2011, 9 pages.
Rossbach, C. et al., PTask: Operating System Abstractions to Manage GPUs as Compute Devices, SOSP '11 Cascais, Portugal, 2011, 16 pages.
International Search Report and Written Opinion for PCT application with application No. PCT/US2013/030520, dated May 6, 2013, 8 pages.

* cited by examiner

*Primary Examiner* — Scott Sun
(74) *Attorney, Agent, or Firm* — Moritt Hock & Hamroff LLP; Steven S. Rubin, Esq.

(57) ABSTRACT

Technologies are generally described for methods and systems effective to provide accelerator buffer access. An operating system may allocate a range of addresses in virtual address spaces and a range of addresses in a buffer mapped region of a physical (or main) memory. A request to read from, or write to, data by an application may be read from, or written to, the virtual address space. A memory management unit may then map the read or write requests from the virtual address space to the main or physical memory. Multiple applications may be able to operate as if each application has exclusive access to the accelerator and its buffer. Multiple accesses to the buffer by application tasks may avoid a conflict because the memory controller may be configured to fetch data based on respective application identifiers assigned to the applications. Each application may be assigned a different application identifier.

31 Claims, 7 Drawing Sheets

ACCELERATOR BUFFER ACCESS

CROSS REFERENCE TO RELATED APPLICATIONS

This application is a 371 of International Application No. PCT/US13/30520 filed Mar. 12, 2013, the entirety of which is hereby incorporated by reference.

BACKGROUND

Unless otherwise indicated herein, the materials described in this section are not prior art to the claims in this application and are not admitted to be prior art by inclusion in this section.

In multi-core architectures, multiple processor cores may be included in a single integrated circuit die or on multiple integrated circuit dies that are arranged in a single chip package. A cache may be used to store data for access by one or more of the processor cores. An accelerator may be a special purpose processor focused on processing data for one or more applications.

SUMMARY

In some examples, methods for an accelerator to store data in a buffer are generally described. The methods may include receiving a first request by the accelerator to process data associated with a first task dispatched by a first application. The methods may include requesting a first data for the first task in a first range of addresses from a memory. The first range of addresses may be mapped to a second range of addresses in a first virtual space assigned to the first application. The methods may further include receiving the first data. The methods may include storing the first data in the buffer. The methods may include receiving a second request by the accelerator to process data associated with a second task dispatched by a second application. The methods may further include requesting for the second application at least some second data in a third range of addresses from the memory. The third range of addresses may be mapped to a fourth range of addresses in a second virtual space assigned to the second application. The methods may include receiving a portion of the second data. The methods may include storing the portion of the second data in the buffer.

In some examples, systems configured to store data for access in a buffer of an accelerator are generally described. The systems may include an accelerator processor, a buffer configured in communication with the accelerator processor, and a buffer controller configured in communication with the accelerator processor and the buffer. The buffer controller may be configured to receive a first request to process data associated with a first task dispatched by a first application. The buffer controller may be configured to, in response to the first request, request first data in a first range of addresses from a memory. The first range of addresses may be mapped to a second range of addresses. The second range of addresses may be in a first virtual space assigned to the first application. The buffer controller may be configured to receive the first data. The buffer controller may be configured to store the first data in the buffer. The buffer controller may be configured to receive a second request to process data associated with a second task dispatched by a second application. The buffer controller may be configured to, in response to the second request, request at least some second data in a third range of addresses from the memory. The third range of addresses may be mapped to a fourth range of addresses. The fourth range of addresses may be in a second virtual space assigned to the second application. The buffer controller may be configured to receive at least a portion of the second data. The buffer controller may be configured to store the portion of the second data in the buffer.

In some examples, systems configured to store data for access in a buffer of an accelerator are generally described. The systems may include an accelerator processor, a buffer configured in communication with the accelerator processor, and a buffer controller configured in communication with the accelerator processor and the buffer. The systems may further include an operating system configured in communication with the buffer controller, a memory configured in communication with the operating system and the buffer controller, and a memory management unit configured in communication with the memory, with a first application and with a second application. The memory management unit may be configured to map a first range of addresses in the memory to a second range of addresses. The second range of addresses may be in a first virtual space assigned to the first application. The memory management unit may be configured to map a third range of addresses in the memory to a fourth range of addresses. The fourth range of addresses may be in a second virtual space assigned to the second application. The operating system may be configured to receive a first request by a first application to use the accelerator processor. The operating system may be configured to receive a second request by a second application to use the accelerator processor. The operating system may be configured to send the first request to the buffer controller. The operating system may be configured to send the second request to the buffer controller. The buffer controller may be configured to receive the first request. The buffer controller may be configured to, in response to the first request, request first data in the first range of addresses from the memory. The buffer controller may be configured to receive the first data. The buffer controller may be configured to store the first data in the buffer. The buffer controller may be configured to receive the second request. The buffer controller may be configured to, in response to the second request, request at least some second data in the third range of addresses from the memory. The buffer controller may be configured to receive at least a portion of the second data and store the portion of the second data in the buffer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the present detailed description, reference is made to the accompanying drawings, which form a part hereof. In the drawings, similar symbols typically identify similar components, unless context dictates otherwise. The illustrative embodiments described in this detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatus, systems, devices, and computer program products related to accelerator buffer technologies.

Briefly stated, technologies are generally described for methods and systems effective to provide accelerator buffer access. An operating system may allocate a range of addresses in virtual address spaces and a range of addresses in a buffer mapped region of a physical (or main) memory. A request to read from, or write to, data by an application may be read from, or written to, the virtual address space. A memory management unit may then map the read or write requests from the virtual address space to the main or physical memory. Multiple applications may be able to operate as if each application has exclusive access to the accelerator and its buffer. Multiple accesses to the buffer by application tasks may avoid a conflict because the memory controller may be configured to fetch data based on respective application identifiers assigned to the applications. Each application may be assigned a different application identifier.

Figure 1:
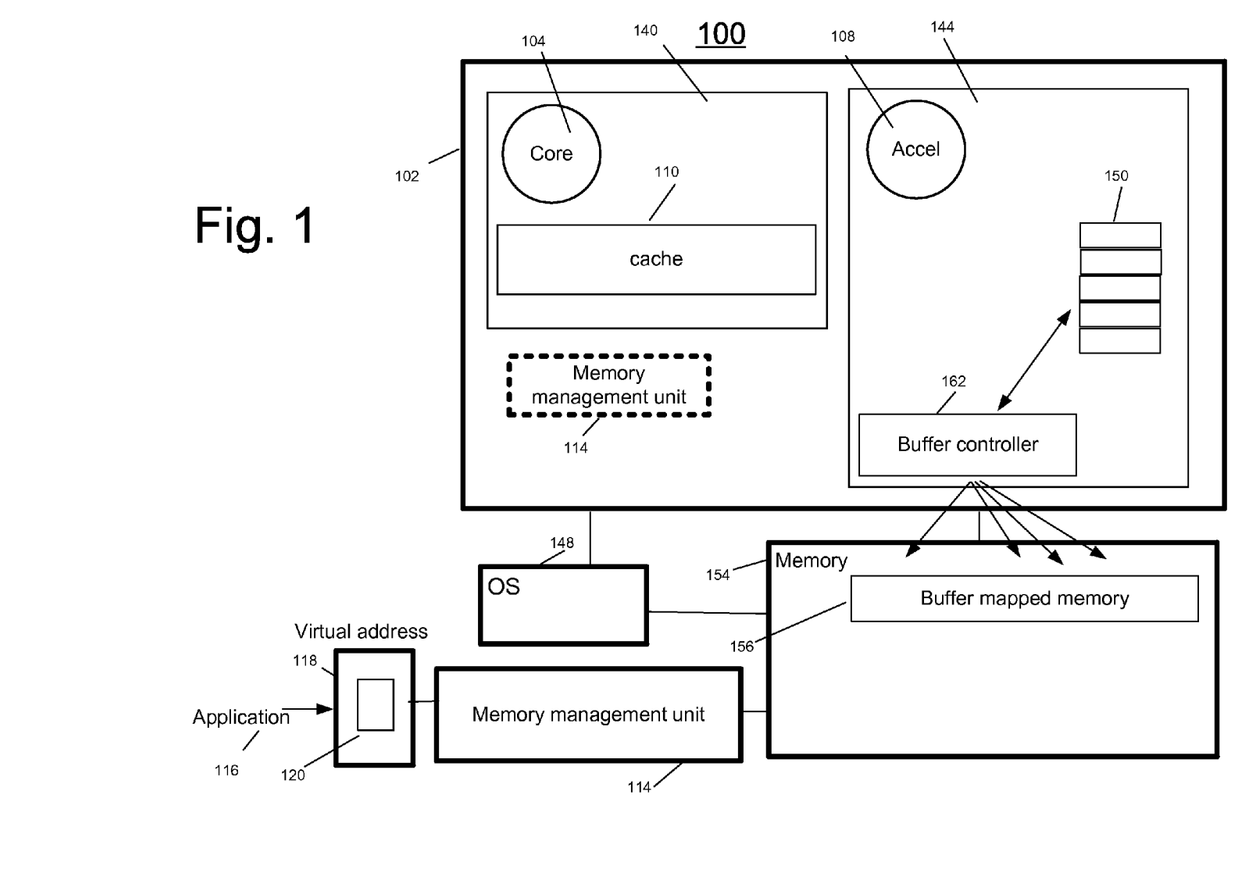
FIG. 1 illustrates an example system that can be utilized to implement accelerator buffer access.

FIG. 1 illustrates an example system that can be utilized to implement accelerator buffer access arranged in accordance with at least some embodiments described herein. An example system 100 may include a die 102, an operating system ("OS") 148, a main memory 154 and/or a memory management unit 114. Cores may each have a private memory management unit or multiple cores may share a memory management unit. Memory management unit 114 may located on or off of die 102. Die 102 may be configured to be in communication with operating system 148 and/or main memory 154. Die 102 may include a tile 140, and/or an accelerator tile 144. Tile 140 may include a processor core 104 and/or a cache 110. Tile 144 may include an accelerator processor ("Accel") 108. Accelerator processor 108 may be, for example, a processor core devoted to a particular operation such as a compression engine, cryptographic engine, XML (extensible markup language) engine, regular expression engine, packet processing engine, graphics processing unit, etc. Accelerator tile 144, including accelerator processor 108, may include a buffer 150 and/or a buffer controller 162. Buffer controller 162 may be configured to control movement of data into and out of buffer 150. Main memory 154 may include a buffer mapped region 156. Buffer mapped region 156 may include two or more ranges of physical addresses mapped to buffer 150.

As discussed in more detail below, an application 116 may access, such as write to, or read from, data stored in buffer 150. For example, application 116 may write to a range of addresses 120 in a virtual address space 118. Memory management unit 114 may be configured to map range of addresses 120 to a particular range of addresses in buffer mapped region 156. Application 116 may dispatch a task (sometimes referred to herein as "application task") to run on accelerator 108. The task may access buffer 150. Buffer 150 is managed by buffer controller 162. Buffer controller 162 may be configured to fetch data in the range of addresses in buffer mapped region 156. Buffer controller 162 may be configured to store data in the range of addresses in buffer mapped region 156 in buffer 150.

Figure 2:
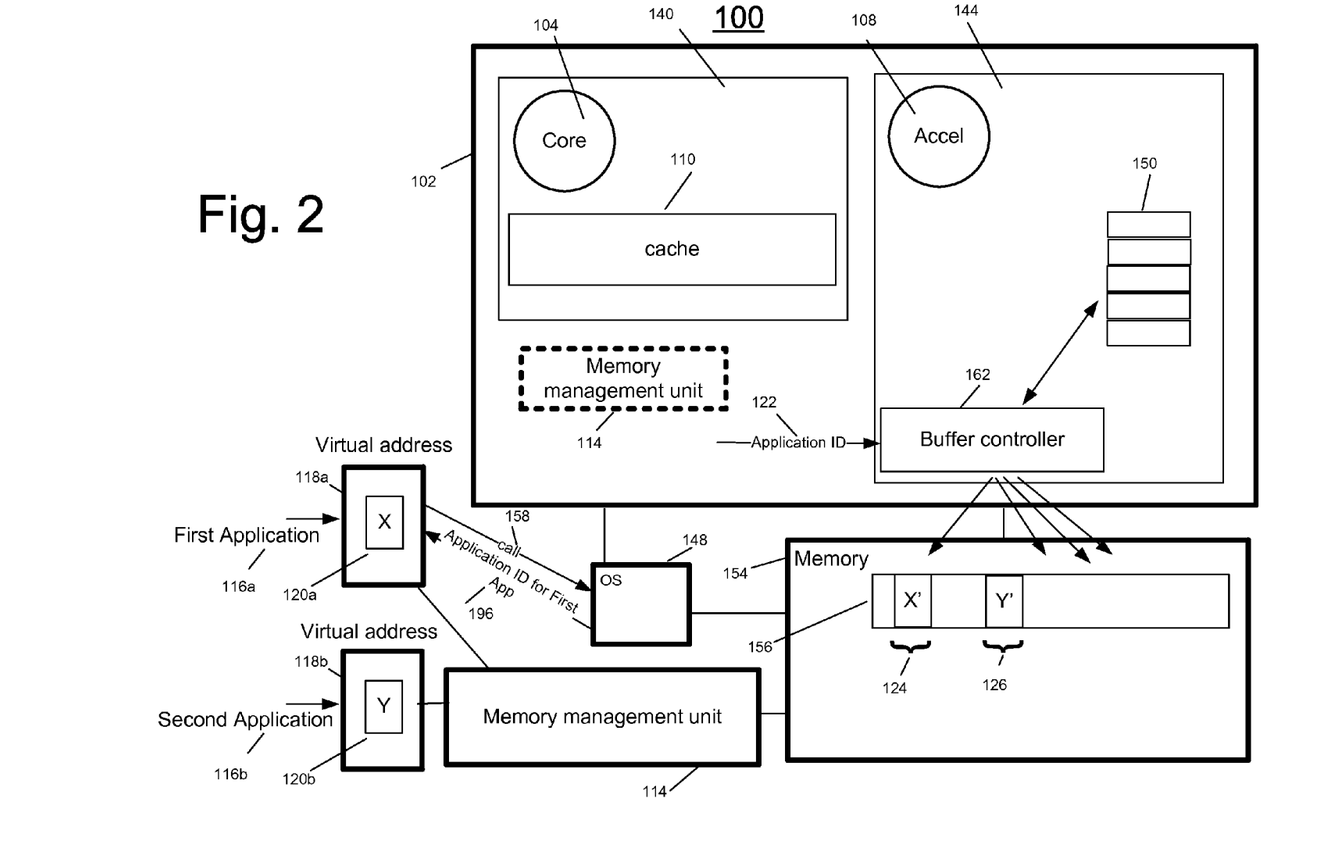
FIG. 2 illustrates the example system that can be utilized to implement accelerator buffer access of FIG. 1 with additional details.

FIG. 2 illustrates the example system that can be utilized to implement accelerator buffer access of FIG. 1 with additional details arranged in accordance with at least some embodiments described herein. Those components in FIG. 2 that are labeled identically to components of FIG. 1 will not be described again for the purposes of clarity.

In an example shown in FIG. 2, a first application 116a may be allocated a range of addresses 120a (illustrated by "X") in a virtual address space 118a. Similarly, a second application 116b may be allocated a range of addresses 120b (illustrated by "Y") in a virtual address space 118b. An application may include a series of instructions and may include one or more threads. Range of addresses 120a, 120b may be allocated and defined by operating system 148. Range of addresses 120a, 120b may facilitate access to accelerator buffer 150 by the first application and/or the second application. The first application and the second application may dispatch tasks to run on accelerator 108. These applications or tasks may access buffer 150 by writing to, and/or reading from, range of addresses 120a, 120b. In one example, range of addresses 120a, 120b may be the size of multiples of one page—such as 4 KB, 8 KB, 12 KB, and so on, in size.

Memory management unit 114 may map range of addresses 120a, 120b to ranges in buffer mapped region 156. In the example shown, range of addresses 120a (demarcated by "X") may be mapped to range 124 in buffer mapped region 156 (demarcated by "X'"). In the example shown, range of addresses 120b (demarcated by "Y") may be mapped to range 126 in buffer mapped region 156 (demarcated by "Y'"). Range of addresses 124, 126 may be located in multiple locations in buffer mapped region 156 or may be localized in a range of addresses.

As explained in more detail below, buffer controller 162, may receive an application identifier ("Application ID") 122. Buffer controller 162 may use application identifier 122 to determine which one of the range of addresses 124, 126 in buffer mapped region 156 to fetch for buffer 150. Each range of addresses 124, 126 may have a size about equal to a size of buffer 150. Buffer mapped region 156 may have a size about equal to a size of buffer 150 multiplied by a number of application identifiers available for use by applications.

As explained more detail below, operating system 148 may allocate buffer mapped region 156 for buffer 150. In examples where an application needs to use accelerator 108, the application may issue a call 158 to operating system 148 to dispatch a task to the accelerator 108 and obtain an application identifier for the application. In response to call 158, operating system 148 may assign application identifier 196 for the application and schedule the task on accelerator 108. Operating system 148 may also allocate range of addresses 120a or 120b in virtual address spaces 118a, 118b and allocate range of addresses 124 or 126 in buffer mapped region 156. In the example, a request to read from, or write to, data by first application 116a may be read from, or written to, virtual address space 118a. Memory management unit 114 may then map read or write requests from virtual address space 118a to main or physical memory 154. Multiple applications may be able to operate as if each application has exclusive use of the accelerator 108 and exclusive access to buffer 150. Multiple accesses to the buffer by application tasks may avoid a conflict because buffer controller 162 may be configured to fetch data based on application identifier 122. Each application may have a different application identifier.

Figure 3:
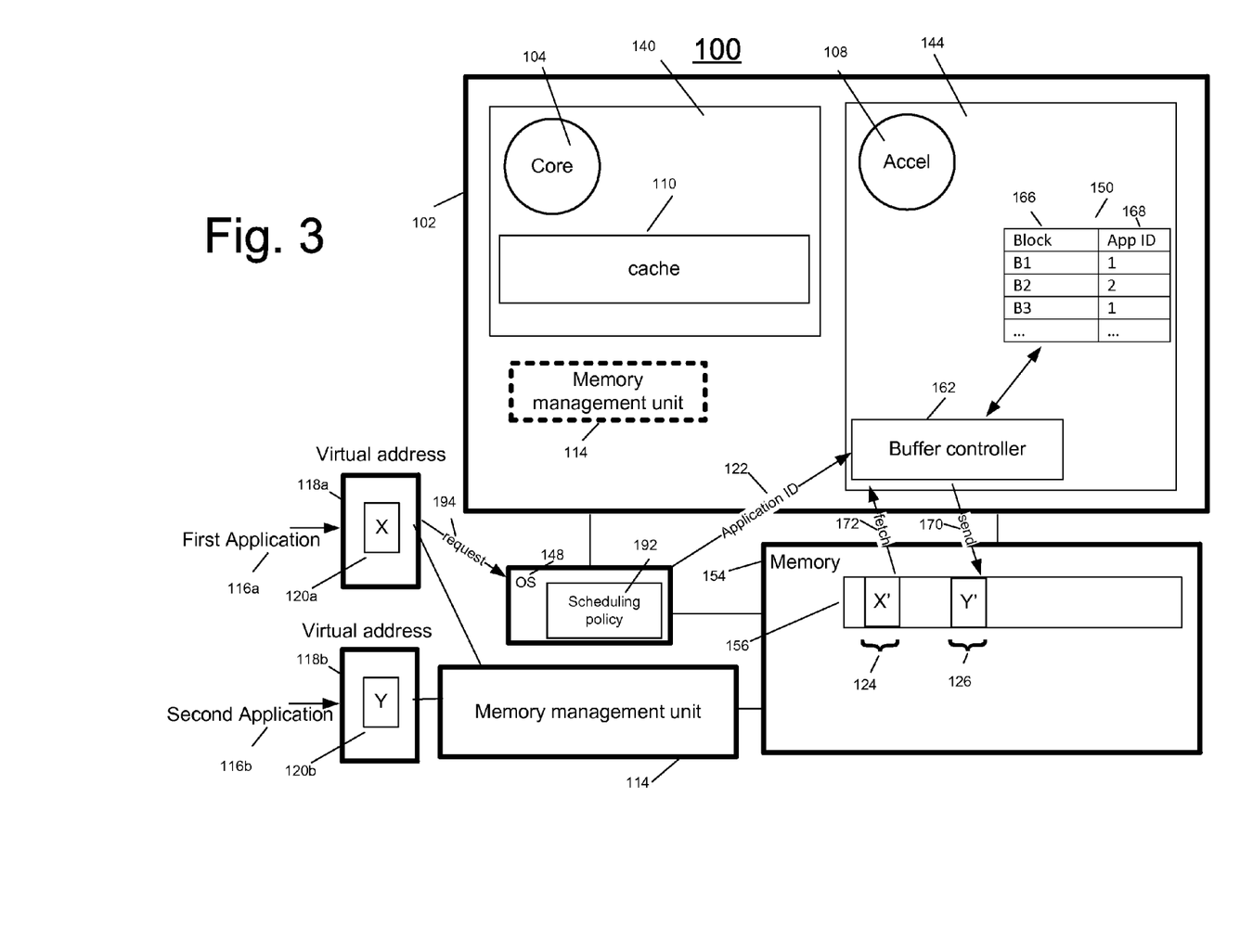
FIG. 3 illustrates the example system that can be utilized to implement accelerator buffer access of FIG. 2 with additional details relating to methods for handling movement of data into the buffer.

FIG. 3 illustrates the example system that can be utilized to implement accelerator buffer access of FIG. 2 with additional details relating to methods for handling movement of data into the buffer arranged in accordance with at least some embodiments described herein. Those components in FIG. 3 that are labeled identically to components of FIG. 1 or 2 will not be described again for the purposes of clarity.

One of the many benefits of system 100 is that the data in buffer 150 may be switched from a first application to a second application (such as from one task to a second task) so that multiple applications may use accelerator processor 108 simultaneously (i.e., in a time share manner). Data in buffer 150 may be switched even before accelerator processor 108 has completed processing of the data relating to the first application. A change in application identifier 122 may reflect a different application task running on accelerator processor 108 and accessing buffer 150. In an example, first application 116a may issue a request 194 to operating system 148 to dispatch a task to accelerator processor 108 and access buffer 150. Operating system 148 may generate application identifier 122 and send an application task to accelerator 108 and application identifier 122 to buffer controller 162 based on the scheduling policy. Operating system 148 and scheduling policy 192 may be configured to control access to accelerator processor 108 and buffer 150. Scheduling policy 192 may be configured to provide for time sharing, taking into account thread prioritization, or other thread scheduling parameters.

In one example, when a new application identifier 122 is received by buffer controller 162, buffer controller 162 may write back data in buffer 150 to a buffer map region or a cache. Buffer controller 162 may then fetch data in buffer mapped region 156 corresponding to the new application identifier 122.

In another example, when a new application identifier 122 is received by buffer controller 162, buffer controller 162 may update buffer 150 as portions of buffer 150 are requested by the new application task. For example, buffer 150 may define a block field 166 and/or an application identifier ("App ID") field 168. Data in fields defined by buffer 150 and buffer mapped region 156 may be divided into blocks of equal or similar size. In the example shown in FIG. 3, blocks B1, B2 and B3 are shown. Application identifier field 168 may store an indication corresponding to the application in association with the indicated block in block field 166. In the example, block B1 for the first application may be stored in buffer 150. Block B2 for the second application may be stored in buffer 150. Block B3 for the first application may be stored in buffer 150. In examples where a task requests access to a block in buffer 150, buffer controller 162 may analyze application identifier 122 and application identifier field 168. Buffer controller 162 may determine whether buffer 150 is currently storing the requested block for the requested application.

In an example, the accelerator task of the first application may request access to block B1. Buffer controller 162 may analyze application identifier 122 and application identifier field 168. Buffer controller 162 may determine that buffer 150 is currently storing block B1 for the first application—i.e. a "hit". Consequently, accelerator processor 108 can access block B1 for the first application.

In an example, the first application or first task of the first application may request access to block B2. Buffer controller 162 may analyze application identifier 122 and application identifier field 168. Buffer controller 162 may determine that buffer 150 is not currently storing block B2 for the first application —i.e. a "miss". In response to the miss, buffer controller 162 may send block B2 to memory 154. Buffer controller 162 may write block B2 of the second application to range of locations 126 in buffer mapped region 156. The writing of block B2 is illustrated by a "send" request 170. Buffer controller 162 may also fetch block B2 for the first application from buffer mapped region 156 as illustrated by "fetch" request 172. Buffer controller 162 may continue to fetch blocks in response to misses.

Figure 4:
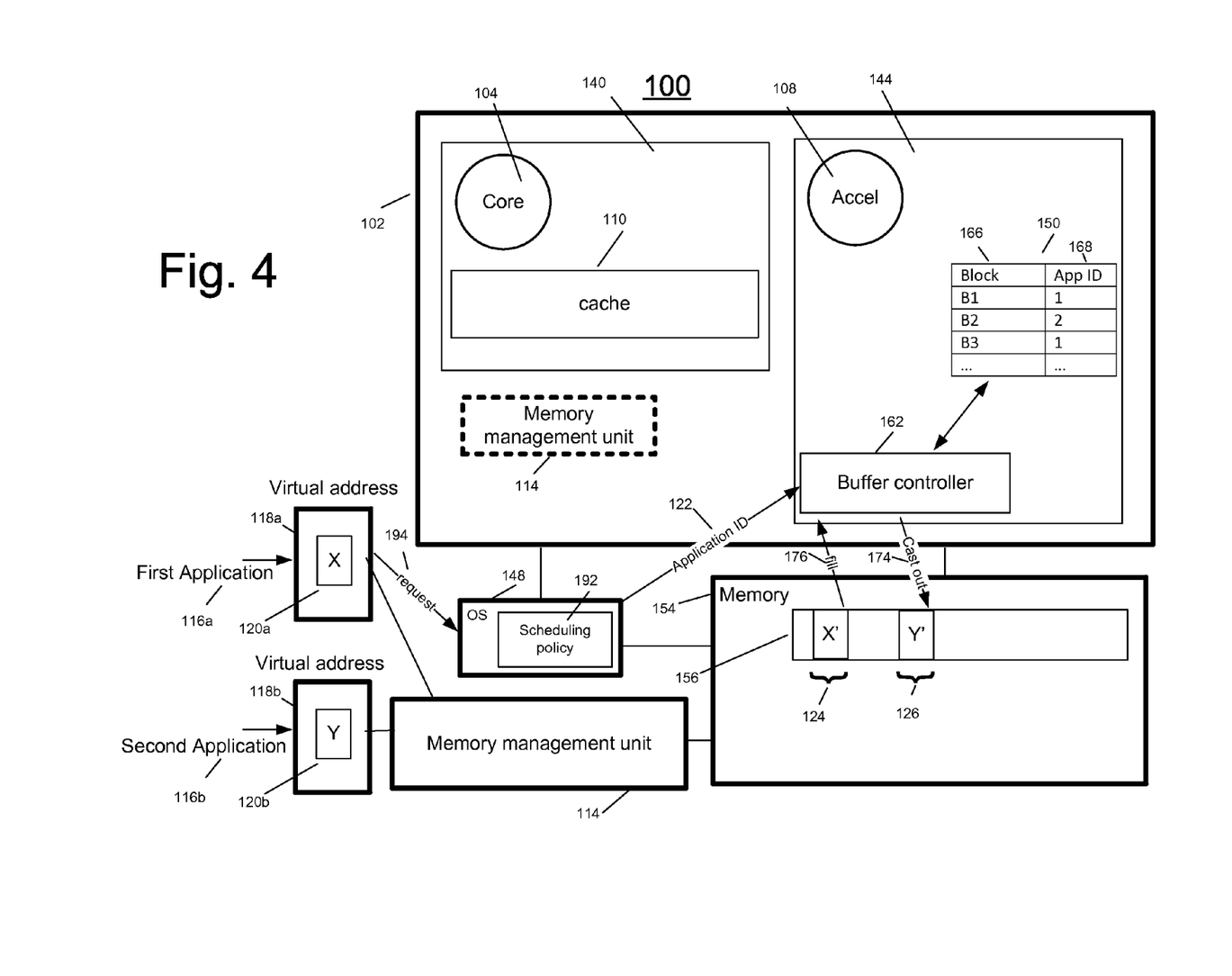
FIG. 4 illustrates the example system that can be utilized to implement accelerator buffer access of FIG. 2 with additional details relating to additional methods for handling movement of data into the buffer.

FIG. 4 illustrates the example system that can be utilized to implement accelerator buffer access of FIG. 2 with additional details relating to additional methods for handling movement of data into the buffer arranged in accordance with at least some embodiments described herein. Those components in FIG. 4 that are labeled identically to components of FIG. 1, 2 or 3 will not be described again for the purposes of clarity.

In an example, when buffer controller 162 determines that a new application identifier 122 has been received, buffer controller 162 may begin to swap data between buffer 150 and memory 154. In this way, buffer controller 162 may act as a state machine or swap engine. In an example, the first application may request access to block B2. Buffer controller 162 may analyze application identifier 122 and application identifier field 168. Buffer controller 162 may determine that buffer 150 is not currently storing block B2 for the first application—i.e. a "miss". In response to the miss, buffer controller 162 may write block B2 of the second application to range of locations 126 in buffer mapped region 156. The writing of block B2 is illustrated by a "cast out" request 174. Buffer controller 162 may also fetch block B2 for the task of the first application from buffer mapped region 156 as illustrated by "fill" request 176. By performing the cast out and fill requests, buffer controller 162 may ensure that a missed block is swapped before other blocks are swapped.

Among other possible benefits, a system in accordance with the disclosure may be able to allow applications to communicate directly with an accelerator buffer. Multiple application processes may share an accelerator and view an accelerator as exclusively belonging to the application. Multiple applications may time share the accelerator, creating an illusion of exclusive access to the accelerator. Another benefit is that the operating system need not be involved in accessing the accelerator buffer. An application may write to a virtual address and the writing may appear in the accelerator's buffer. Likewise, a task may write to the accelerator's buffer and the writing may appear in the application's virtual address. An application may view the buffer as part of the accelerator's memory. An accelerator may view the buffer as a resource that the accelerator can access in any way a programmer using accelerator wishes, such as using the buffer as a scratchpad memory, a FIFO (first in, first out) buffer, a software cache, etc.

With use of a scheduling policy, thread priority may be achieved. In thread priority, one thread in a first application having a higher priority may access the accelerator and the accelerator's buffer prior to another thread having a lower priority in a second application. Thread starvation, where one thread does not experience sufficient access to the accelerator and the accelerator's buffer, may be avoided even when large tasks are executed. A task running in an accelerator may be preempted and/or context switched by another higher priority task. Context switch latency may be maintained relatively short even in a relatively large buffer.

Figure 5:
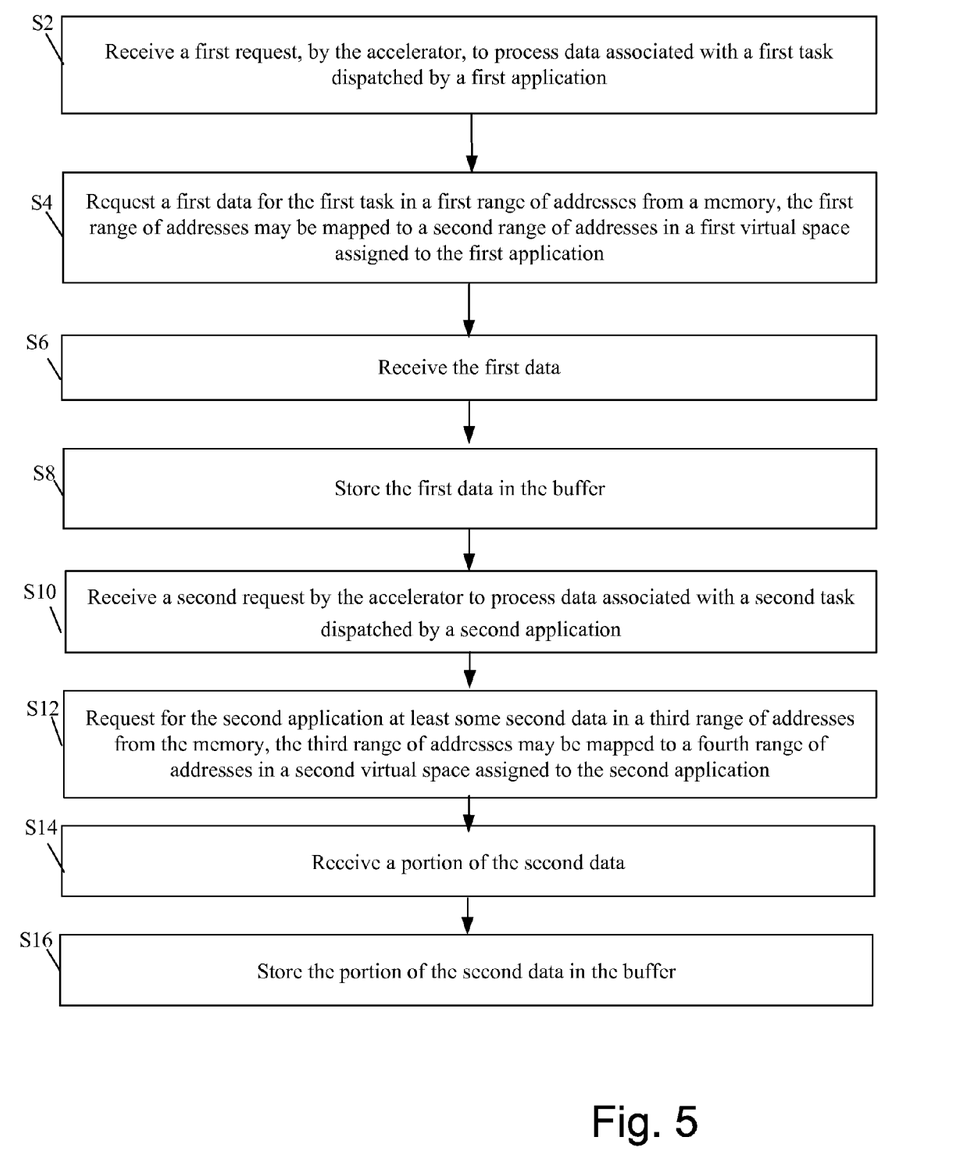
FIG. 5 depicts a flow diagram for an example process for implementing accelerator buffer access.

FIG. 5 depicts a flow diagram for an example process for implementing accelerator buffer access arranged in accordance with at least some embodiments described herein. In some examples, the process in FIG. 5 could be implemented using system 100 discussed above for an accelerator to store data in a buffer.

An example process may include one or more operations, actions, or functions as illustrated by one or more of blocks S2, S4, S6, S8, S10, S12, S14 and/or S16. Although illustrated as discrete blocks, various blocks may be divided into additional blocks, combined into fewer blocks, or eliminated, depending on the desired implementation.

Processing may begin at block S2, "Receive a first request, by the accelerator, to process data associated with a first task dispatched by a first application." At block S2, an accelerator may receive a request to process data associated with a first application. The first request may have been generated by a first application dispatching a first task. The request may have been sent by an operating system based on a scheduling policy.

Processing may continue from block S2 to block S4, "Request a first data for the first application in a first range of addresses from a memory, the first range of addresses may be mapped to a second range of addresses in a first virtual space assigned to the first application." At block S4, the accelerator may request first data for the first application in a first range of addresses from a memory. The first range of addresses may be mapped to a second range of addresses in a first virtual space assigned to the first application. The first request may include a first application identifier for the first application.

Processing may also continue from block S4 to block S6, "Receive the first data." At block S6, the accelerator may receive the first data.

Processing may continue from block S6 to block S8, "Store the first data in the buffer." At block S8, the accelerator may store the first data in the buffer.

Processing may continue from block S8 to block S10, "Receive a second request by the accelerator to process data associated with a second task dispatched by second application." At block S10, the accelerator may receive a second request to process data relating to a second application. The request may have been generated by a second application dispatching a second task. The second request may include a second application identifier for the second application.

Processing may continue from block S10 to block S12, "Request for the second application at least some second data in a third range of addresses from the memory, the third range of addresses may be mapped to a fourth range of addresses in a second virtual space assigned to the second application." At block S12, the accelerator may request for the second application at least some second data in a third range of addresses from the memory. The third range of addresses may be mapped to a fourth range of addresses in a second virtual space assigned to the second application. Prior to receiving the first request, a memory management unit may map the first range of addresses to the second range of addresses and map the third range of addresses to the fourth range of addresses. An operating system may assign the application identifiers to the first and second applications.

Processing may continue from block S12 to block S14, "Receive a portion of the second data." At block S14, the accelerator may receive a portion of the second data.

Processing may continue from block S14 to block S16, "Store the portion of the second data in the buffer." At block S16, the accelerator may store the portion of the second data in the buffer. The accelerator may further store, in the buffer, an indication of the first block of the first data and an indication of the first application in association with the first block. The accelerator may further store, in the buffer, an indication of a second block of the second data and an indication of the second application in association with the second block. The accelerator may receive a third request, where the third request includes an indication of a third block of the first data in association with an indication of the first application. The accelerator may determine that the buffer does not store the indication of the third block in association with the indication of the first application. The accelerator may request the third block for the first application from the memory.

In one example, when a new application identifier is received, a buffer controller may fetch data in a buffer mapped region that corresponds to the new application identifier. In another example, when a new application identifier is received, the buffer controller may update the buffer as portions of the buffer are requested by the new application. The buffer controller may maintain fields with application identifiers and indications as to whether data corresponding to the application is stored in the buffer. In another example, when a new application identifier is received, the buffer controller may start swapping data into the buffer for the new application and prioritize swapping of data that is requested and missed by the buffer controller.

Figure 6:
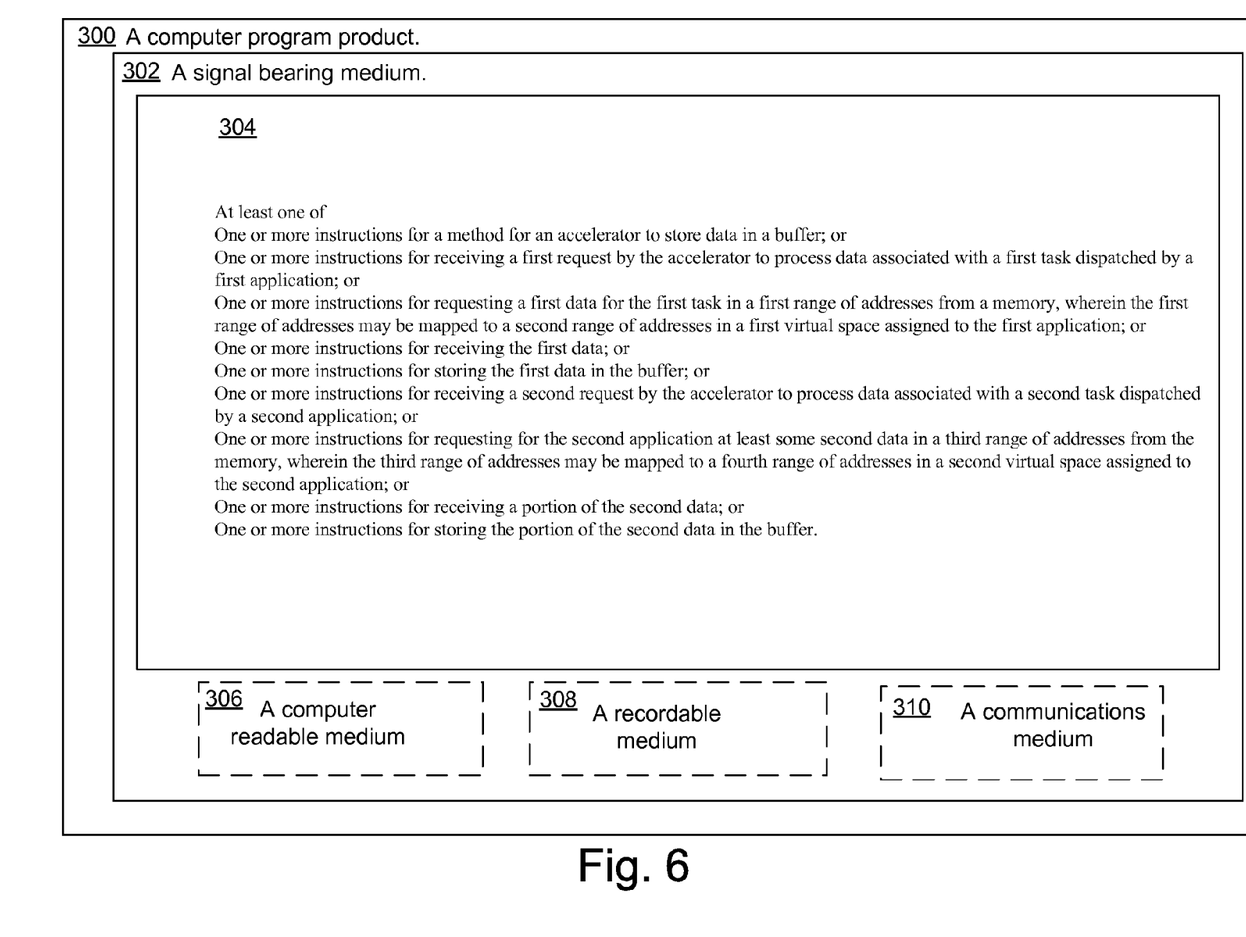
FIG. 6 illustrates a computer program product that can be utilized to implement accelerator buffer access.

FIG. 6 illustrates an example computer program product 300 that can be utilized to implement accelerator buffer access arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-5. Thus, for example, referring to system 100, one buffer controller 162 may undertake one or more of the blocks shown in FIG. 6 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 7:
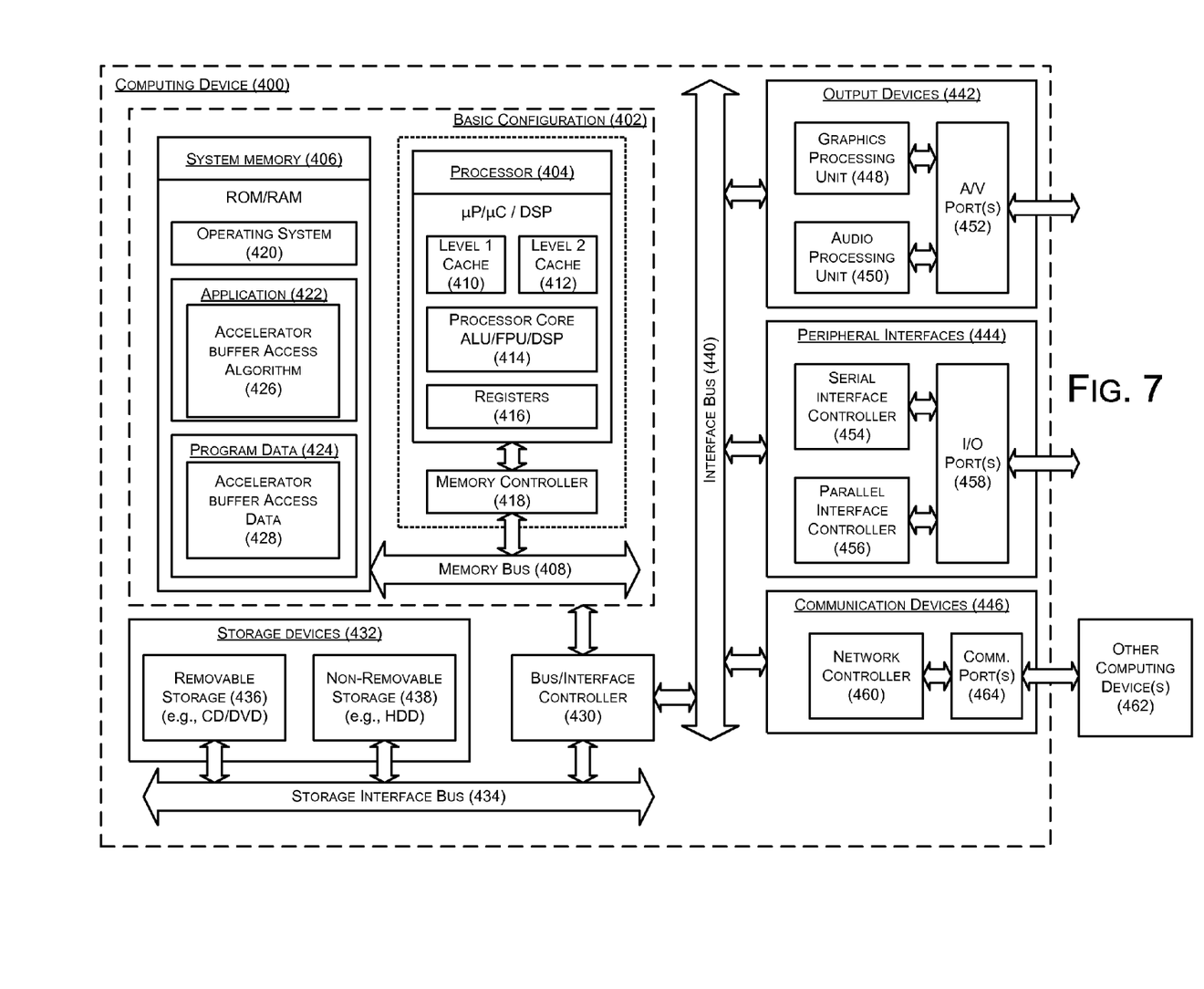
FIG. 7 is a block diagram illustrating an example computing device that is arranged to implement accelerator buffer access; all arranged according to at least some embodiments described herein.

FIG. 7 is a block diagram illustrating an example computing device 400 that is arranged to implement accelerator buffer access arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an accelerator buffer access algorithm 426 that is arranged to perform the functions as described herein including those described with respect to system 100 of FIGS. 1-6. Program data 424 may include accelerator buffer access data 428 that may be useful to implement accelerator buffer access as is described herein. In some embodiments, application 422 may be arranged to operate with program data 424 on operating system 420 such that accelerator buffer access may be provided. This described basic configuration 402 is illustrated in FIG. 7 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for an accelerator to store data in a buffer, the method comprising:
    receiving, a first request, by the accelerator, to process data associated with a first task dispatched by a first application;
    requesting a first data for the first task in a first range of addresses from a memory, wherein the first range of addresses are mapped to a second range of addresses in a first virtual space assigned to the first application;
    receiving the first data;
    storing the first data in the buffer;
    receiving, a second request, by the accelerator, to process data associated with a second task dispatched by a second application;
    requesting for the second application at least some second data in a third range of addresses from the memory, wherein the third range of addresses is mapped to a fourth range of addresses in a second virtual space assigned to the second application;
    receiving a portion of the second data; and
    storing the portion of the second data in the buffer.

2. The method of claim 1, further comprising, prior to receiving the first request:
    mapping the first range of addresses to the second range of addresses by a memory management unit; and
    mapping the third range of addresses to the fourth range of addresses by the memory management unit.

3. The method of claim 1, wherein:
    the first request includes a first application identifier for the first application; and
    the second request includes a second application identifier for the second application different from the first application identifier.

4. The method of claim 1, wherein:
    the first request includes a first application identifier for the first application;
    the second request includes a second application identifier for the second application different from the first application identifier; and the method further comprises, prior to receiving the first request:
        receiving, by an operating system, a call from the first application; and
        assigning, by the operating system, the first application identifier to the first application in response to the call.

5. The method of claim 1, wherein:
    the first request includes a first application identifier for the first application;
    the second request includes a second application identifier for the second application different from the first application identifier; and the method further comprises, prior to receiving the first request:
receiving, by an operating system, a first call from the first application;
assigning, by the operating system, the first application identifier to the first application in response to the first call;
receiving, by the operating system, a second call from the second application;
assigning, by the operating system, the second application identifier to the second application in response to the second call;
receiving, by the operating system, a request from the first application to use the accelerator;
analyzing, by the operating system, a scheduling policy; and
sending the first application identifier or the second application identifier to the accelerator based on the request from the first application to use the accelerator and based on the scheduling policy.

6. The method of claim 1, further comprising:
receiving the second request before the accelerator has completed processing of the first task; and
requesting the at least a portion of the second data before the accelerator has completed processing the first task.

7. The method of claim 1, further comprising:
writing back the first data in response to receiving the second request.

8. The method of claim 1, wherein storing the first data in the buffer comprises:
storing, in the buffer, an indication of a first block of the first data; and
storing, in the buffer, an indication of the first application in association with the indication of the first block.

9. The method of claim 1, further comprising:
storing, in the buffer, an indication of a first block of the first data;
storing, in the buffer, an indication of the first application in association with the first block;
storing, in the buffer, an indication of a second block of the second data; and
storing, in the buffer, an indication of the second application in association with the second block.

10. The method of claim 1, further comprising:
storing, in the buffer, an indication of the first block of the first data;
storing, in the buffer, an indication of the first application in association with the first block;
storing, in the buffer, an indication of a second block of the second data;
storing, in the buffer, an indication of the second application in association with the second block;
receiving a third request, wherein the third request includes an indication of a third block of the first data in association with an indication of the first application; and
determining that the buffer does not store the indication of the third block in association with the indication of the first application; and
requesting the third block for the first application from the memory.

11. The method of claim 1, the method further comprising:
storing, in the buffer, an indication of a first block of the first data;
storing, in the buffer, an indication of the first application in association with the first block;
storing, in the buffer, an indication of a second block of the second data;
storing, in the buffer, an indication of the second application in association with the second block;
requesting the second data from the memory;
processing the second task by the accelerator;
determining, by the accelerator, that the second task requests access to a third block in association with the second application;
determining that the buffer does not store an indication of the third block in association with an indication of the second application; and
requesting the third block for the second application from the memory.

12. A system configured to store data for access in a buffer of an accelerator, the system comprising:
an accelerator processor;
a buffer configured in communication with the accelerator processor; and
a buffer controller configured in communication with the accelerator processor and the buffer;
wherein the buffer controller is configured to:
receive a first request to process data associated with a first task dispatched by a first application;
in response to the first request, request first data in a first range of addresses from a memory, wherein the first range of addresses are mapped to a second range of addresses, the second range of addresses are in a first virtual space assigned to the first application;
receive the first data;
store the first data in the buffer;
receive a second request to process data associated with a second task dispatched by a second application;
in response to the second request, request at least some second data in a third range of addresses from the memory, wherein the third range of addresses is mapped to a fourth range of addresses, the fourth range of addresses are in a second virtual space assigned to the second application;
receive at least a portion of the second data; and
store the portion of the second data in the buffer.

13. The system of claim 12, wherein:
the first request includes a first application identifier for the first application; and
the second request includes a second application identifier for the second application different from the first application identifier.

14. The system of claim 12, wherein the buffer controller is further configured to:
receive the second request before the accelerator processor has completed processing of the first task; and
request the portion of the second data before the accelerator processor has completed processing the first task.

15. The system of claim 12, wherein the buffer controller is further configured to write back first data in response to receipt of the second request.

16. The system of claim 12, wherein the buffer controller is further configured to:
store, in the buffer, an indication of a first block of the first data; and
store, in the buffer, an indication of the first application in association with the indication of the first block.

17. The system of claim 12, wherein the buffer controller is further configured to:
store, in the buffer, an indication of a first block of the first data;
store, in the buffer, an indication of the first application in association with the first block;

store, in the buffer, an indication of a second block of the second data; and store, in the buffer, an indication of the second application in association with the second block.

18. The system of claim 12, wherein the buffer controller is further configured to:
  store, in the buffer, an indication of a first block of the first data;
  store, in the buffer, an indication of the first application in association with the first block;
  store, in the buffer, an indication of a second block of the second data;
  store, in the buffer, an indication of the second application in association with the second block;
  receive a third request, wherein the third request includes an indication of a third block of the first data in association with an indication of the first application;
  determine that the buffer does not store the indication of the third block in association with the indication of the first application; and
  request the third block for the first application from the memory.

19. The system of claim 12, wherein the buffer controller is further configured to:
  store, in the buffer, an indication of a first block of the first data;
  store, in the buffer, an indication of the first application in association with the first block;
  store, in the buffer, an indication of a second block of the second data;
  store, in the buffer, an indication of the second application in association with the second block;
  request the second data from the memory;
  process the second task by the accelerator processor;
  determine that the second task requests access to a third block in association with the second application;
  determine that the buffer does not store an indication of the third block in association with an indication of the second application; and
  request the third block for the second application from the memory.

20. A system configured to store data for access in a buffer of an accelerator, the system comprising:
  an accelerator processor;
  a buffer configured in communication with the accelerator processor;
  a buffer controller configured in communication with the accelerator processor and the buffer;
  an operating system configured in communication with the buffer controller;
  a memory configured in communication with the operating system and the buffer controller;
  a memory management unit configured in communication with the memory, with a first application and with a second application, wherein the memory management unit is configured to:
    map a first range of addresses in the memory to a second range of addresses, wherein the second range of addresses are in a first virtual space assigned to the first application;
    map a third range of addresses in the memory to a fourth range of addresses, wherein the fourth range of addresses are in a second virtual space assigned to the second application;
  the operating system is configured to:
    receive a first request by a first application to use the accelerator processor;
    receive a second request by a second application to use the accelerator processor;
    send the first request to the buffer controller; and
    send the second request to the buffer controller;
  the buffer controller is configured to:
    receive the first request;
    in response to the first request, request first data in the first range of addresses from the memory;
    receive the first data;
    store the first data in the buffer;
    receive the second request;
    in response to the second request, request at least some second data in the third range of addresses from the memory;
    receive at least a portion of the second data; and
    store the portion of the second data in the buffer.

21. The system of claim 20, wherein:
  the first request includes a first application identifier for the first application; and
  the second request includes a second application identifier for the second application different from the first application identifier.

22. The system of claim 20, wherein the operating system is further effective to:
  assign a first application identifier for the first application; and
  assign a second application identifier for the second application different from the first application identifier.

23. The system of claim 20, wherein the operating system is further effective to:
  assign a first application identifier for the first application;
  assign a second application identifier for the second application different from the first application identifier;
  analyze a scheduling policy; and
  send the first application identifier or the second application identifier to the accelerator processor based on the first request by the first application, the second request by the second application and the scheduling policy.

24. The system of claim 20, wherein the buffer controller is further configured to:
  receive the second request before the accelerator processor has completed processing data relating to the first application; and
  request the at least a portion of the second data before the accelerator processor has completed processing data relating to the first application.

25. The system of claim 20, wherein the buffer controller is further configured to delete the first data in the buffer in response to receipt of the second request.

26. The system of claim 20, wherein the buffer controller is further configured to:
  store, in the buffer, an indication of a first block of the first data; and
  store in the buffer, an indication of the first application in association with the indication of the first block.

27. The system of claim 20, wherein the buffer controller is further configured to:
  store, in the buffer, an indication of a first block of the first data in the buffer;
  store, in the buffer, an indication of the first application in association with the first block;
  store, in the buffer, an indication of a second block of the second data; and
  store, in the buffer, an indication of the second application in association with the second block.

28. The system of claim 20, wherein the buffer controller is further configured to:
- store, in the buffer, an indication of a first block of the first data;
- store, in the buffer, an indication of the first application in association with the first block;
- store, in the buffer, an indication of a second block of the second data;
- store, in the buffer, an indication of the second application in association with the second block;
- receive a third request, wherein the third request includes an indication of a third block in association with an indication of the first application;
- determine that the buffer does not store the indication of the third block in association with the indication of the first application; and
- request the third block for the first application from the memory.

29. The system of claim 20, wherein the buffer controller is further configured to:
- store, in the buffer, an indication of a first block of the first data;
- store, in the buffer, an indication of the first application in association with the first block;
- store, in the buffer, an indication of a second block of the second data;
- store, in the buffer, an indication of the second application in association with the second block;
- request the second data from the memory;
- process a second task;
- determine, by the accelerator processor, that the second task requests access to a third block of the second data;
- determine that the buffer does not store an indication of the third block in association with an indication of the second application; and
- request the third block for the second application from the memory.

30. The system of claim 20, wherein the operating system is further effective to allocate a buffer mapped region in the memory, wherein the buffer mapped region includes the first and the third range of addresses, the first and third range of addresses have a size about equal to a size of the buffer.

31. The system of claim 28, wherein the buffer controller is further configured to:
- in response to the receipt of the third request, and before the determination that the buffer does not store the indication of the third block in association with the indication of the first application, write the second block in association with the second application to the third range of addresses in the memory;
- receive the third block for the first application from the memory; and
- store, in the buffer, the indication of the third block in association with the first application.

* * * * *

UNITED STATES PATENT AND TRADEMARK OFFICE
CERTIFICATE OF CORRECTION

| | | |
|---|---|---|
| PATENT NO. | : 8,868,800 B2 | Page 1 of 1 |
| APPLICATION NO. | : 13/978655 | |
| DATED | : October 21, 2014 | |
| INVENTOR(S) | : Yan Solihin | |

It is certified that error appears in the above-identified patent and that said Letters Patent is hereby corrected as shown below:

On the Title Page, in Item (71), under "Applicant", Line 1, delete ",", therefor.

Signed and Sealed this
Twenty-first Day of April, 2015

Michelle K. Lee
*Director of the United States Patent and Trademark Office*